Patented Jan. 4, 1944

2,338,220

UNITED STATES PATENT OFFICE 2,338,220

PROCESS OF MAKING OXAZOLIDINEDIONES

Vernon H. Wallingford, Ferguson, Mo., assignor to Mallinckrodt Chemical Works, St. Louis, Mo., a corporation of Missouri No Drawing. Application January 31, 1942, Serial No. 429,113

15 Claims. (Cl. 260—307)

This invention relates to oxazolidinediones, and more particularly to 2,4-oxazolidinediones.

Among the objects of this invention are the preparation of 2,4-oxazolidinediones; the provision of a method for the preparation of compounds of the type indicated, which may be carried out easily and quickly; and the preparation of compounds of the type described, from readily available materials. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the processes hereinafter described, and the scope of the application of which will be indicated in the following claims.

The present invention relates to compounds of the following type formula:

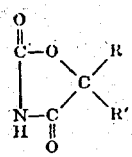

in which R and R' are hydrogen, hydrocarbon radicals or substituted hydrocarbon radicals.

It has been found that 2,4-oxazolidinediones may be conveniently prepared by the reaction of an α-hydroxy primary amide with a dialkyl carbonate. The reaction is carried out in the presence of a condensing agent, such as a metal alcoholate, and is preferably also carried out in a solvent, such as an alcohol or an excess of the dialkyl carbonate itself. The reaction may be represented by the following equation:

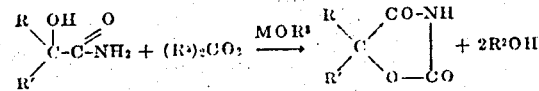

in which R and R' are hydrogen, hydrocarbon radicals, or substituted hydrocarbon radicals, $R^2$ is the alkyl of the dialkyl carbonate, M is the metal of the metal alcoholate, and $R^3$ is the alkyl of the alcoholate.

Throughout the specification and claims, where the term alkyl appears, it will be understood that aralkyl and cycloalkyl radicals are included. Similarly, where the terms alkyl, aryl or aralkyl appear, it will be understood that substituted radicals of the respective type are likewise included.

The following examples illustrate the invention:

EXAMPLE 1

5-phenyl-2,4-oxazolidinedione

Sodium metal (2.4 g.) was dissolved in methyl alcohol (25 ml.) by heating gently. Mandelamide (15.1 g.) and diethyl carbonate (13.6 g.) in warm methyl alcohol (50 ml.) were added to the cooled sodium methylate solution over a 15–20 minute period. The reaction mixture solidified at 35° C., but formed a homogeneous solution at 50° C. After one-half hour at this temperature the alcohol was distilled off at reduced pressure. The cooled residue was dissolved in ice water (100 ml.) and the resulting aqueous solution extracted with isopropyl ether. The extracted aqueous solution was then acidified with concentrated hydrochloric acid (7.2 ml.) and the white, crystalline product filtered off. After drying in a vacuum desiccator over concentrated sulfuric acid, the yield of 5-phenyl-2,4-oxazolidinedione, M. P. 107.5–108.5° C., was 15.3 g. (86.5%).

EXAMPLE 2

5,5-di-isopropyl-2,4-oxazolidinedione

Sodium metal (2.3 g.) was dissolved in dry methyl alcohol (45 ml.) in a three-necked, 200 ml. flask fitted with reflux condenser and mercury-sealed stirrer. To the cooled solution was added a solution of α-hydroxy-α-isopropyl-isovaleramide (15.9 g.), diethyl carbonate (13.8 g.) and dry methyl alcohol (6 ml.). The reaction mixture was heated to refluxing (68–70° C.) and held thus for four hours. Alcohol was then distilled off at atmospheric pressure. The cooled residue was dissolved in cold water (50 ml.) and the resulting yellowish aqueous solution extracted with isopropyl ether. The aqueous solution was next treated with about one gram bonecoal, and after filtering, the almost colorless, clear solution was acidified with dilute sulfuric acid (10.5 ml.). The precipitated oil was seeded with a crystal of 5,5-di-isopropyloxazolidinedione. Standing over night in the ice box brought about crystallization of the product. It was filtered off, washed with ice water, and dried to constant weight at 70° C. The yield of 5,5-di-isopropyl-2,4-oxazolidinedione, M. P. 85–88° C., was 15.8 grams (85.4%).

EXAMPLE 3

5-tert.-butyl-5-methyl-2,4-oxazolidinedione

Sodium metal (2.4 g.) was dissolved in dry methyl alcohol (45 ml.) in a three-necked, 200 ml. flask fitted with reflux condenser and mercury-sealed stirrer. To this cooled solution was added α-hydroxy-α, β,β-trimethylbutyramide (14.5 g.) and diethyl carbonate (13.6 g.) dissolved in methyl alcohol (12 ml.). The reaction mixture was refluxed three hours and allowed to cool down. Alcohol was distilled off at reduced pressure and the cooled residue was dissolved in ice water (125 ml.). The slightly hazy solution was extracted with isopropyl ether and then acidified with dilute sulfuric acid (10.5 ml.). The precipitated oil crystallized on seeding, and after standing over night in the ice box, the crystalline material was filtered off, washed with ice water and dried to constant weight at 70° C. The yield of dried material, M. P. 85.5–86.3° C. was 13.1 g. (76.7%). A mixture melting point with a sample of pure 5-tert.-butyl-5-methyl-2,4-oxazolidinedione was 85.5–86.3° C.

Example 4

5-methyl-2,4-oxazolidinedione

Sodium metal (4.3 g.) was dissolved in methyl alcohol (45 ml.) in a three-necked 200 ml. flask fitted with reflux condenser and mercury-sealed stirrer. To the cooled solution was added lactamide (15.8 g.) and diethyl carbonate (24.1 g.) dissolved in methyl alcohol (35 ml.). The reaction mixture was heated one hour at 50–55° C. and then allowed to stand and cool one hour. The alcohol was distilled off at reduced pressure and the cooled residue then dissolved in ice water (100 ml.). The aqueous solution was extracted with isopropyl ether, and then acidified with concentrated hydrochloric acid (14 ml.). The acidified aqueous solution was extracted with isopropyl ether. The ether extract was dried, and after distilling off the solvent, the residual oil was distilled at 2–3 mm. from a 125 ml. Claisen flask. The oily distillate, collected between 118 and 127° C.; weight 16 grams (78.5% of theory). The oil crystallized on cooling.

Example 5

5-n-amyl-2,4-oxazolidinedione

Sodium metal (9.0 g.) was dissolved in dry methyl alcohol (100 ml.) in a three-necked, 500 ml. flask fitted with a reflux condenser and a mercury-sealed stirrer. To the cooled solution was added α-hydroxy enanthamide (48 g.) and diethyl carbonate (48.5 g.) The reaction mixture was then refluxed for three hours. After distilling off the alcohol at atmospheric pressure, the cooled residue was dissolved in cold water (100 ml.), acidified with concentrated hydrochloric acid (40 ml.) and the white crystalline product filtered off. After air drying the yield of crude product, M. P. 74–76° C., was 58 g. (95%). After recrystallization from benzene the yield of pure 5-n-amyl-2,4-oxazolidinedione, M. P. 75–76° C., amounted to 49.5 g. (82%).

Example 6

5-(1-ethylamyl)-2,4-oxazolidinedione

Sodium metal (5.2 g.) was dissolved in dry methyl alcohol (60 ml.) in a three-necked, 500 ml. flask, fitted with a reflux condenser and a mercury-sealed stirrer. To the cooled solution was added a solution of β-ethyl-α-hydroxy-enanthamide (39 g.) and diethyl carbonate (27 g.) over a ten minute period. The reaction mixture was then refluxed for five and one-half hours. After the alcohol had been distilled off at atmospheric pressure the cooled residue was dissolved in ice water (250 ml.) and the resulting yellowish aqueous solution extracted with isopropyl ether. The aqueous solution was next treated with about one gram of bonecoal, and after filtering, the colorless clear solution was acidified with hydrochloric acid. The precipitated oil was taken up in ether and distilled in a Claisen flask under reduced pressure. The fraction boiling at 144–146° C. at 2.5 mm. pressure was collected, and amounted to 35 g. (78%). Thus 5-(1-ethylamyl)-2,4-oxazolidinedione was obtained as a colorless viscous oil which would not solidify to a crystalline solid.

Example 7

5-ethyl-5-n-hexyl-2,4-oxazolidinedione

Sodium metal (4.3 g.) was dissolved in dry methyl alcohol (50 ml.) in a three-necked, 500 ml. flask, fitted with a reflux condenser and a mercury-sealed stirrer. To the cooled solution was added a solution of α-ethyl-α-hydroxy-caprylamide (32 g.) and diethyl carbonate (22 g.) in methyl alcohol (10 ml.) over a five minute period. The reaction mixture was refluxed for four hours. After the alcohol had been distilled off at atmospheric pressure, the cooled residue was dissolved in ice water (200 ml.) and the resulting yellowish solution extracted with isopropyl ether. The aqueous solution was next treated with about one gram of bonecoal, and after filtering, the colorless clear solution was acidified with hydrochloric acid. The precipitated oil was taken up in ether and distilled in a Claisen flask under reduced pressure. The fraction boiling at 149–151° C. at 3 mm. pressure was collected and amounted to 29 g. (80%) of essentially pure 5-ethyl-5-n-hexyl-2,4-oxazolidinedione. On standing over night, it solidified to a solid which melted at 30–31° C. Recrystallization from petroleum ether raised the melting point only one degree (to 31–32° C.) with a 70% recovery.

Example 8

5-benzyl-5-ethyl-2,4-oxazolidinedione

Sodium metal (3.2 g.) was dissolved in dry methyl alcohol (40 ml.) in a three-necked 200 ml. flask, fitted with a reflux condenser and a mercury-sealed stirrer. To the cooled solution was added a solution of α-benzyl-α-hydroxy butyramide (27 g.) and diethyl carbonate (19 g.) in warm methyl alcohol (10 ml) over a period of fifteen minutes. The reaction mixture was then refluxed for six hours. After distilling off the alcohol at atmospheric pressure, the cooled residue was dissolved in ice water (200 ml.) and the resulting aqueous solution extracted with isopropyl ether. The aqueous solution was next treated with about one gram of bonecoal, and after filtering, the colorless clear solution was acidified with dilute sulfuric acid. The precipitated oil, on standing over night in the ice box solidified. This solid was filtered off and after air drying the yield of crude product, M. P. 70–75° C., amounted to 28 g. (91.5%). After recrystallizing from carbon tetrachloride-petroleum ether mixture a yield of 24 g. (79%) of pure 5-benzyl-5-ethyl-2,4-oxazolidinedione, M. P. 90–91° C. was obtained.

Example 9

2,4-oxazolidinedione

Sodium metal (4.8 g.) was dissolved in dry methyl alcohol (50 ml.) in a three-necked, 200 ml. flask fitted with reflux condenser and mercury-sealed stirrer. To this cooled solution was added glycolamide (15 g.) and diethyl carbonate (27.1 g.) dissolved in dry methyl alcohol (52 ml.). The resulting reaction mixture was cooled from its initial temperature of 60-62° C. and held at 52-55° C. for one hour. Excess alcohol was distilled off at reduced pressure (200-300 mm.) and the resulting cooled residue dissolved in ice water (100 ml.). The aqueous solution was extracted once with ether (100 ml.), then diluted with an equal volume of water, and acidified with dilute sulfuric acid (22 ml. of 10% acid). The acidified solution was extracted with isopropyl ether, the combined extracts were dried with anhydrous sodium sulfate, and after filtering, the ether was distilled off. The oily residues weighed 19.2 g. (95% crude yield). On dissolving in alcohol, treating with decolorizing carbon, and evaporating the filtered solution to a small bulk, a crystalline product was obtained, melting at 86.5-90° C.

EXAMPLE 10

*5,5-di-n-propyl-2,4-oxazolidinedione*

Sodium metal (2.4 g.) was dissolved in n-propyl alcohol (50 ml.) in a three-necked, 200 ml. flask fitted as described in Example 1. To the cooled solution were added di-n-propyl-glycolamide (15.1 g.) and di-n-propyl carbonate (16.8 g.). The mixture was heated and stirred at 50-58° C. for two hours. Alcohol was then distilled off at reduced pressure. The cooled residue was dissolved in ice water (100 ml.) and the resulting solution treated with bonecoal. The filtered, clear solution was acidified with conc. hydrochloric acid. The oil which precipitated was redissolved in sodium hydroxide and the alkaline solution extracted with isopropyl ether. The aqueous solution was acidified with conc. hydrochloric acid, warmed to drive off the ether and then cooled, seeded and allowed to stand in the ice box over night. The crystalline product, which formed from the precipitated oil, was filtered off and dried in a vacuum desiccator over conc. $H_2SO_4$. The dried crystalline product weighed 12.6 g. (72% yield). M. P.=39-41° C.

EXAMPLE 11

*5-ethyl-5-phenyl-2,4-oxazolidinedione*

Potassium metal (5.15 g.) was dissolved in n-butyl alcohol (50 ml.) in a 200 ml. flask fitted as described in Example 1. To the cooled solution were added α-ethyl-mandelamide (24 g.) and n-butyl carbonate (23.5 g.) dissolved in n-butyl alcohol (35 ml.). The resulting mixture was stirred and heated at 85-87° C. for 9.5 hours. The butyl alcohol was then distilled off under reduced pressure, and the cooled residue dissolved in ice water (50 ml.). After thoroughly extracting with isopropyl ether, the aqueous solution was treated with bonecoal, filtered and acidified with conc. hydrochloric acid. The precipitated oil was washed with cold water and seeded with a known sample of 5-ethyl-5-phenyl-2,4-oxazolidinedione. On cooling in the ice box, the oil crystallized. The product was dried in a vacuum desiccator over conc. sulfuric acid. Yield= 22.6 g. (82%). M. P.=60-62° C.

EXAMPLE 12

*5,5-diphenyl-2,4-oxazolidinedione*

Sodium metal (1.8 g.) was dissolved in dry methyl alcohol (45 ml.) in a 200 ml. flask fitted as described in Example 1. To the cooled solution were added diphenyl-glycolamide (18.1 g.) and diethyl carbonate (11.0 g.) in methyl alcohol (10 ml.). The reaction mixture was refluxed four hours and the alcohol then distilled off. The cooled residue was dissolved in ice water (50 ml.) and the solution extracted with ether (150 ml.). After treating with bonecoal and filtering, acidification with conc. hydrochloric acid precipitated a white crystalline solid. This was filtered off, washed and dried. Yield=19.2 grams (90% of theory). M. P.=131-132.5° C.

EXAMPLE 13

*5,5-di-n-propyl-2,4-oxazolidinedione*

Magnesium turnings (2.5 g.) were dissolved in methyl alcohol (50 ml.) by stirring in a 200 ml., three-necked flask, using carbon tetrachloride (0.6 ml.) as a catalyst. To the cooled solution were added di-n-propylglycolamide (15.9 g.) and diethyl carbonate (15.6 g.). The resulting mixture was stirred and refluxed at 67-68° C. during approximately eight hour periods for a total of sixty hours. The alcohol was then distilled off at atmospheric pressure. The residue was cooled, and after dissolving in ice water and acidifying with conc. hydrochloric acid, the oxazolidinedione was extracted by ether. The ether extract was shaken with dilute sodium hydroxide, the latter solutions then combined and acidified with conc. hydrochloric acid. The oily di-n-propyl-2,4-oxazolidinedione was seeded and cooled in the ice box. The solidified product was filtered off, sucked free of mother liquors and placed in a vacuum desiccator to dry over conc. sulfuric acid. Weight of dry product=16.4 g. (88.6% yield). M. P.=39-41° C.

The present method for the preparation of 2,4-oxazolidinediones is not only easily carried out utilizing readily available materials, but it has been found that oxazolidinediones can be prepared by this method which either cannot be prepared by other methods, or whose preparation is difficult and expensive.

It has likewise been found that the yields obtained by the present method are in many instances substantially greater than those obtained by previously-known methods.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

I claim:

1. The method of preparing 2,4-oxazolidinediones which comprises reacting an α-hydroxy primary amide with a dialkyl carbonate, in the presence of a condensing agent comprising a metal alcoholate.

2. The method of preparing 2,4-oxazolidinediones which comprises reacting an α-hydroxy primary amide with a dialkyl carbonate, in the presence of a metal alcoholate.

3. The method of preparing 2,4-oxazolidinediones which comprises reacting an α-hydroxy primary amide with a dialkyl carbonate, in the alcoholic medium, in the presence of a metal alcoholate.

4. The method which comprises reacting a compound of the type:

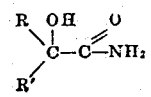

in which R and R' are selected from hydrogen, alkyl radicals, aryl radicals, and aralkyl radicals, with a dialkyl carbonate, in the presence of a metal alcoholate.

5. The method of preparing 5-(1-ethylamyl)-2,4-oxazolidinedione which comprises reacting β-ethyl-α-hydroxy enanthamide with a dialkyl carbonate, in the presence of a metal alcoholate.

6. The method of preparing 5-ethyl-5-n-hexyl-2,4-oxazolidinedione which comprises reacting α-ethyl-α-hydroxy caprylamide with a dialkyl carbonate, in the presence of a metal alcoholate.

7. The method of preparing 5,5-di-n-propyl-2,4-oxazolidinedione which comprises reacting di-n-propylglycolamide with a dialkyl carbonate, in the presence of a metal alcoholate.

8. The method of preparing 5,5-di-n-propyl-2,4-oxazolidinedione which comprises reacting di-n-propylglycolamide with a dialkyl carbonate, in the presence of a metal alcoholate selected from sodium alcoholate and magnesium alcoholate.

9. The method of preparing 5-(1-ethylamyl)-2,4-oxazolidinedione which comprises reacting β-ethyl-α-hydroxy enanthamide with diethyl carbonate in the presence of sodium methylate.

10. The method of preparing 5-ethyl-5-n-hexyl-2,4-oxazolidinedione which comprises reacting α-ethyl-α-hydroxy caprylamide with diethyl carbonate in the presence of sodium methylate.

11. The method of preparing 5,5-di-n-propyl-2,4-oxazolidinedione which comprises reacting di-n-propylglycolamide with di-n-propyl carbonate in the presence of sodium propylate.

12. The method of preparing 5,5-di-n-propyl-2,4-oxazolidinedione which comprises reacting di-n-propylglycolamide with diethyl carbonate in the presence of magnesium methylate.

13. The method of preparing 5-(1-ethylamyl)-2,4-oxazolidinedione which comprises reacting β-ethyl-α-hydroxy enanthamide with a dialkyl carbonate in the presence of a metal alcoholate and in an alcoholic medium.

14. The method of preparing 5-ethyl-5-n-hexyl-2,4-oxazolidinedione which comprises reacting α-ethyl-α-hydroxy caprylamide with a dialkyl carbonate in the presence of a metal alcoholate and in an alcoholic medium.

15. The method of preparing 5,5-di-n-propyl-2,4-oxazolidinedione which comprises reacting di-n-propylglycolamide with a dialkyl carbonate in the presence of a metal alcoholate and in an alcoholic medium.

VERNON H. WALLINGFORD.

CERTIFICATE OF CORRECTION.

Patent No. 2,338,220. January 4, 1944.

VERNON H. WALLINGFORD.

It is hereby certified that error appears in the printed specification of the above numbered patent requiring correction as follows: Page 3, second column, line 67, claim 3, for the words "in the" read --in an--; and that the said Letters Patent should be read with this correction therein that the same may conform to the record of the case in the Patent Office.

Signed and sealed this 29th day of August, A. D. 1944.

Leslie Frazer (Seal) Acting Commissioner of Patents.